United States Patent
Miller et al.

(10) Patent No.: US 7,241,073 B2
(45) Date of Patent: Jul. 10, 2007

(54) SHEET METAL HEM

(75) Inventors: Craig Miller, Macomb Township, MI (US); Peter Friedman, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 10/707,126

(22) Filed: Nov. 21, 2003

(65) Prior Publication Data

US 2005/0111910 A1    May 26, 2005

(51) Int. Cl.
    *B23P 11/00* (2006.01)
(52) U.S. Cl. ............ 403/278; 72/306; 29/243.58; 29/509
(58) Field of Classification Search ......... 29/243.58, 29/509, 513; 72/306, 220; 403/278, 279; 296/29, 191, 146.1
    See application file for complete search history.

(56) References Cited

U.S. PATENT DOCUMENTS

| | | | |
|---|---|---|---|
| 1,289,602 A | 12/1918 | Baehr | |
| 3,909,918 A | 10/1975 | Takizawa et al. | |
| 4,103,406 A | 8/1978 | Ito et al. | |
| 4,131,980 A | 1/1979 | Zinnbauer | |
| 4,497,151 A | 2/1985 | Simpson et al. | |
| 4,916,284 A | 4/1990 | Petrick | |
| 5,224,253 A | 7/1993 | Sawa | |
| 5,237,734 A * | 8/1993 | Polon | ............ 29/513 |
| 5,267,387 A | 12/1993 | Sawa | |
| 5,457,981 A | 10/1995 | Brown et al. | |
| 5,613,726 A * | 3/1997 | Hobbs et al. | ............ 296/186.1 |
| 5,740,691 A | 4/1998 | Kovarovic et al. | |
| 5,783,298 A | 7/1998 | Herring, Jr. et al. | |
| 5,830,559 A | 11/1998 | Goldbach et al. | |
| 6,000,118 A | 12/1999 | Biernat et al. | |
| 6,029,334 A | 2/2000 | Hartley | |
| 6,257,043 B1 | 7/2001 | Wiens | |
| 6,478,915 B1 | 11/2002 | Schmalbruch et al. | |
| 6,523,244 B1 | 2/2003 | Bissonnette | |
| 6,528,176 B1 | 3/2003 | Asai et al. | |
| 6,536,983 B1 * | 3/2003 | Morefield | ............ 403/278 |
| 2001/0029766 A1 | 10/2001 | Wiens | |
| 2003/0209048 A1 | 11/2003 | Friedman et al. | |

* cited by examiner

*Primary Examiner*—Daniel P. Stodola
*Assistant Examiner*—Michael P. Ferguson
(74) *Attorney, Agent, or Firm*—Fred Owens; Brooks Kushman P.C.

(57) ABSTRACT

A reduced radius hem assembly and method for joining an inner panel and an outer panel together. The inner panel has an outwardly extending perimeter flange comprising an end surface, an inboard surface, and a beveled surface located between the end surface and the inboard surface. The outer panel has a peripheral edge comprising a bend portion, an intermediate portion, and an end portion. In the finished hem assembly, the intermediate portion is adjacent to the beveled surface of the perimeter flange and the end portion overlies a portion of the inboard surface of the perimeter flange. The method provides a reduced radius hem while allowing the peripheral edge of the outer panel to cover the marriage gap and minimizing the potential for interference between the inner panel and the outer panel in the hem assembly.

7 Claims, 1 Drawing Sheet

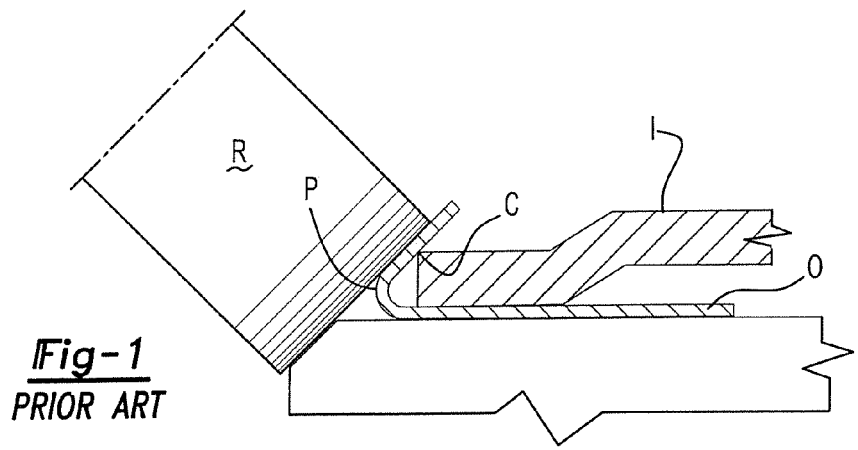
*Fig-1*
PRIOR ART
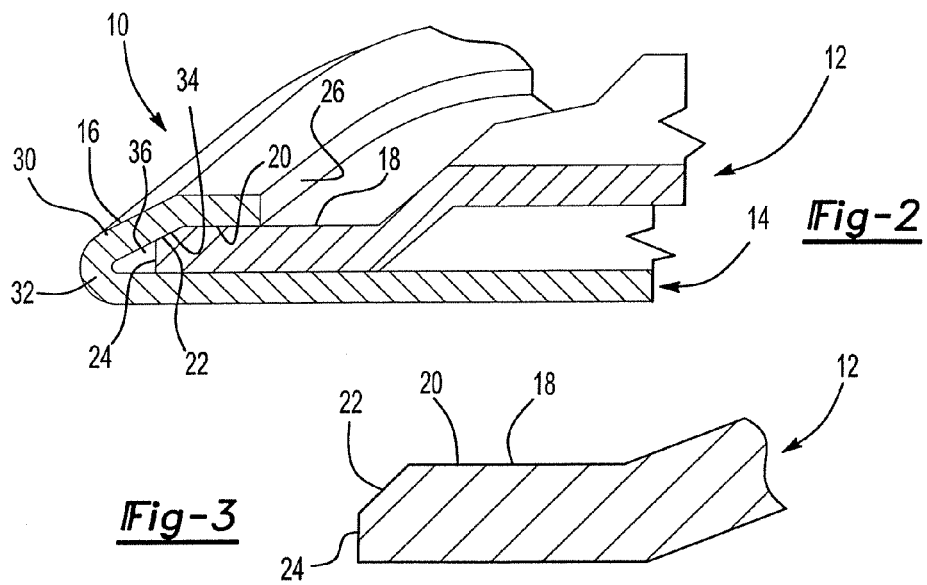
*Fig-2*
*Fig-3*
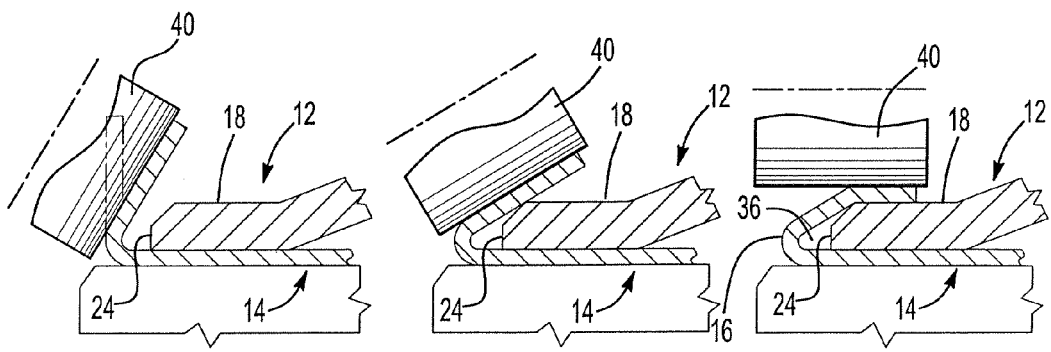
*Fig-4*   *Fig-5*   *Fig-6*

SHEET METAL HEM

BACKGROUND OF INVENTION

1. Field of the Invention

The present invention relates to sheet metal hem flanges and an improved hemming process.

2. Background Art

Hemming is a production process for joining an outer panel to an inner reinforcement panel. Conventional hemming processes are accomplished by bending a peripheral edge of the outer panel back onto the inner panel. A multiple step process is used to form a hem. In a first step, a peripheral edge of an outer panel is formed to extend substantially perpendicularly relative to the body of the outer panel. In a second step, an inner panel is assembled to the outer panel with a perimeter flange being inserted inside the peripheral edge of the outer panel. In the third step, the peripheral edge of the outer panel is pre-hemmed. Prehemming may be performed by forming the peripheral edge to an acute angle of approximately 45° to extend inwardly over the perimeter flange of the inner panel. Alternatively, the edge may be pre-formed in two steps to 60° and then 30°. In a final step, the peripheral edge is formed to extend parallel to the body of the outer panel and engage the perimeter edge of the inner panel.

Hems in highly visible areas such as hoods and doors are key to assessing a vehicle's overall craftsmanship. This is especially true when two closure panels are located adjacent to each other as in the case of a gap formed between two doors or between a hood and a fender. The radius of the hem visually impacts the appearance of the gap, or margin, between the two panels. Larger hems tend to make the margin look larger, while smaller hems produce a crisper cut line and smaller perceived margin. In the prior art, as the thickness of the inner panel increases, the hem radius increases. This, in turn, increases the perceived gap between matched panels. In conventional hemming processes, the final hem radii is a function of the thicknesses of the inner and outer panels. With a conventional hem, the radius is equal to one-half the inner panel thickness plus the outer panel thickness.

Recent developments in the field of hem forming have led to the development of reduced radius hems that improve the appearance of the fit of adjacent panels by reducing the perceived margin between adjacent panels. One example of such a hemming method is disclosed in U.S. application Ser. No. 10/063,757, now U.S. Pat. No. 6,810,707, filed in the name of Samant et al., and assigned to Applicant's assignee. The Samant application describes a method of manufacturing a hem with a reduced radius hem. The method and apparatus discussed in the Samant application produces a hem with a radius sharper than half the total stack height of the inner and outer panels and can significantly improve the craftsmanship of closure panels.

A marriage gap is defined as the space between the outer edge of the perimeter flange of the inner panel and the bend of the peripheral edge of the outer panel. The marriage gap is provided to avoid interference between the two panels. Interference between the panels occurs when, during the pre-hemming pass, the outer panel peripheral edge is being formed into an acute angle to extend over the perimeter flange of the inner flange and improperly comes into contact with the inner panel.

Referring to FIG. 1, a prior art hem flanging operation is illustrated in which an interference occurs between a relatively thick inner panel I and the peripheral edge P of the outer panel O during pre-hemming. A hemming tool R is shown contacting the peripheral edge P of the outer panel O during a pre-hemming pass. A top corner C of the inner panel I interferes or makes contact with the inner surface of the peripheral edge P. This interference may cause distortion in the hem and limit reduction of the hem radius. Interference may cause splitting or tearing of the hem. The marriage gap can be increased to prevent the interference to a limited extent. For conventional hems, the marriage gap is generally approximately 2 millimeters. If the marriage gap is too large, the hem may be weakened and the edge of the panel will become prone to bending or deformation.

Recently, lightweight inner panels have been introduced that are cast or otherwise formed of magnesium, aluminum and other alloys, polymers, or similar materials. These panels are generally thicker than conventional metal inner panels. Conventional steel panels are approximately 0.7–0.8 mm. Conventional aluminum panels range between 0.9 and 1.2 mm. Inner panels made of other materials may be of greater thickness. For example, a cast magnesium alloy inner panel may be 3 to 4 times the thickness of a steel inner panel. Such thick inner panels increase the radius of hems which increases the apparent gap size and adversely effects overall quality and craftsmanship.

The use of thick inner panels creates unique hemming challenges. For thicker inner panels, a 2 millimeter marriage gap is not always sufficient to avoid interference between the panels when using a reduced radius hem. A conventional solution to eliminate interference is to increase the marriage gap. Increased flange length is required to cover the larger marriage gap. This solution may be acceptable in flat-straight areas of the panel but can cause problems in hems on curved edges or surfaces.

Short flange lengths must be provided in areas where there is either cut line or surface curvature. In these areas, splits in either the edge or flange can be caused due to the stretching or compressing of the flange during the bending operation. A conventional solution to solving hemming problems in such areas is to reduce the length of outer panel flanges to mitigate this problem. It may be necessary to reduce outer panel flange lengths to 6 millimeters or less to accommodate cut lines and surface curvatures.

Thick inner panels when hemmed with a reduced radius hemming process may result in edge run out. Edge run out is an unacceptable condition that occurs if the hem edge is not long enough to cover the marriage gap. This problem is particularly difficult with hems in panels having curved cut lines and surface contours.

There is a need for an improved reduced radius hem and hemming process that can accommodate thick inner panels while maintaining the size of the marriage gap and minimizing flange lengths in critical contoured areas. The disadvantages and shortcomings of the prior art are addressed by this invention as summarized below.

SUMMARY OF INVENTION

The present invention provides a reduced radius hem assembly of metal panel materials with a peripheral edge of an outer panel hemmed over a perimeter flange of an inner panel. The outwardly extending perimeter flange comprises an end surface, an inboard surface, and a beveled surface located between the end surface and the inboard surface. The outer panel has a peripheral edge comprising a bend portion, an intermediate portion, and an end portion. The intermediate portion of the outer panel is adjacent to the beveled surface of the inner panel perimeter flange. The end portion of the outer panel overlies a portion of the inboard surface of the inner panel perimeter flange. The beveled surface of the inner panel reduces the possibility that the outer panel will interfere with the inner panel. Reduced radius hem processes incorporating inner panels with the beveled surface produce tighter hems while maintaining the size of the marriage gap and minimizing flange lengths in critical areas.

According to one aspect of the present invention, the thickness of the inner panel is greater than the thickness of the outer panel. The beveled surface reduces the thickness of the inner panel flange allowing reduced radius hem processes to accommodate thick inner panels while maintaining the size of the marriage gap and minimizing flange lengths in critical areas.

According to yet another aspect of the present invention, the hem assembly may include areas that define cut lines. The beveled surface provided in areas defining cut lines allows outer panel flange lengths to be shortened. The beveled surface reduces the likelihood of interference occurring between the inner and outer panel. Flange lengths in cut line areas can be minimized while maintaining the size of the marriage gap.

According to yet another aspect of the present invention, the hem assembly may include areas that follow surface curvature. Beveled surfaces provided in areas defining surface curvature minimize interference between inner and outer panels while maintaining the size of the marriage gap and minimizing flange lengths.

These and other features and advantages of the invention will be more fully understood from the following detailed description of the invention in view of the accompanying drawings.

BRIEF DESCRIPTION OF DRAWINGS

FIG. 1 is a schematic cross-sectional view of a prior art hem wherein interference occurs between the outer and inner panels;

FIG. 2 is a schematic cross-sectional view of an improved hem made according to one embodiment of the present invention;

FIG. 3 is an end elevation view of an inner panel peripheral flange made in accordance with one embodiment of the present invention; and FIGS. 4–6 are a series of schematic views showing the formation of a hem flange assembly progressing from a 60 degree pre-hemming step, a 30 degree pre-hemming step and a final hemming step.

DETAILED DESCRIPTION

Referring to FIG. 2, a hem assembly 10 for a vehicle closure panel is shown. An inner panel 12 and outer panel 14 are joined with a peripheral edge 16 of an outer panel being folded back over a perimeter flange 18 of the inner panel 12. The perimeter flange 18 is tightly gripped by the outer panel 14.

The perimeter flange 18 of the inner panel has an inboard surface 20, a beveled surface 22 and an end surface 24. The peripheral edge 16 of the outer panel 14 has a distal portion 26, a intermediate portion 30 and a bend portion 32. An inner surface 34 of the peripheral edge 16 at the intermediate portion 30 of the outer panel 14 is adjacent to the beveled surface 22 of the inner panel 12. The inner surface 34 of the peripheral edge 16 at the distal portion 26 of the outer panel 14 abuts the inboard surface 20 of the perimeter flange 18 of the inner panel 12. The beveled surface 22 is located between the end surface 24 and the inboard surface 20 of the perimeter flange 18. The end surface 24 generally lies in a plane perpendicular to the inboard surface 20. The beveled surface 22, as illustrated, is generally flat and is located in a third plane with respect to the end surface 24 and the inboard surface 20. Alternatively, the beveled surface 22 could be configured as a curved or partially conical shape. A marriage gap 36 is defined between the end surface 24 and the inner surface of the peripheral edge 16 at the bend portion 32.

Referring to FIG. 3, a thick inner panel 12 made according to the present invention is shown. The top corner of the inner panel 12 has been removed to form the beveled surface 22. The top corner may be ground off during a deburring operation prior to assembly. Other methods may be used to form the beveled surface 22, such as chamfering, molding, or stamping. In the illustrated embodiment, the beveled surface is oriented at approximately a 45° angle relative to the inboard surface 20.

The invention may be practiced on all or only a portion of a hem assembly 10. For example, a door may have straight hem areas that are simple to form and cut lines or curved areas that are difficult to form. The beveled surface 22 may be formed on the perimeter flange 18 of the inner panel 12 only where the difficult to form cut lines and curved surface areas exist to eliminate hemming problems. The beveled surface 22 could also be formed in straight hem areas to improve overall craftsmanship of the body panel.

Referring to FIG. 4, a method for forming a hem according to the present invention is described. A roller 40 applies a force to the peripheral edge 16 to achieve approximately a 60° angle in a pre-hemming step. In this pass, the radius of the hem assembly is set before contact is made between the inner surface 34 and the inner panel 12 at the beveled surface 22.

Referring to FIG. 5, in the second pass of the roller 40 the peripheral edge 16 is formed to approximately a 30° angle and does not come into contact with the beveled surface 22.

Referring to FIG. 6, in the final hemming pass the roller 40 compresses the distal portion 26 of the outer panel 14 to contact the inner panel 12 inboard surface 20. The method creates a hem assembly 10 having a sharp radius with adequate peripheral edge coverage.

While the best mode for carrying out the invention has been described in detail, those familiar with the art to which this invention relates will recognize various alternative designs and embodiments for practicing the invention as defined by the following claims.

The invention claimed is:

1. A reduced radius hem assembly comprising:
an inner sheet metal panel including an inner panel inner surface and an inner panel outer surface on opposite parallel sides that are spaced apart by the nominal thickness of the inner panel, the inner panel having an outwardly extending perimeter flange terminating as an end disposed in a first plane, the end having a thickness dimension that is less than the thickness of the inner panel, the inner surface lying in a second plane that is generally perpendicular to the end, and a beveled surface located between and contiguous with the end and the inner surface, the beveled surface being disposed inboard of the intersection of the first and second planes; and
an outer sheet metal panel including an outer panel inner surface and an outer panel outer surface on opposite parallel sides that are spaced apart by the nominal thickness of the outer panel wherein the inner surface of the outer panel, wherein the inner surface of the outer panel overlies the outer surface of the perimeter flange, the outer panel having a peripheral edge comprising a bend portion, an intermediate portion, and an end portion wherein the intermediate portion is adjacent to the beveled surface of the perimeter flange and the end portion overlies a portion of the inner surface of the perimeter flange.

2. The reduced radius hem assembly of claim 1 wherein the thickness of the inner panel is greater than the thickness of the outer panel.

3. The reduced radius hem assembly of claim 1 wherein the inner panel comprises a magnesium composite material.

4. The reduced radius hem assembly of claim 1 wherein the perimeter flange of the inner panel is provided with the beveled surface that extends across a portion of the perimeter flange.

5. The reduced radius hem assembly of claim 4 wherein the hem assembly includes areas that define cut lines and wherein the beveled surface is provided in the areas defining cut lines.

6. The reduced radius hem assembly of claim 4 wherein the hem assembly includes areas that define surface curvature and wherein the beveled surface is provided in the areas defining surface curvature.

7. A hem comprising:
an inner sheet form panel, the inner panel including an inner panel inner surface and an inner panel outer surface on opposite parallel sides that are spaced apart by the nominal thickness of the inner panel;

an outer panel that hems the inner panel, the outer panel including an outer panel inner surface and an outer panel outer surface on opposite parallel sides that are spaced apart by the nominal wherein the inner surface of the outer panel overlies the outer surface of inner panel thickness of the outer panel, wherein the inner panel has an outwardly extending peripheral flange having a nominal thickness, the peripheral flange comprising an end that has a thickness that is less than the nominal thickness of the flange, an inboard surface that is perpendicular to the end, and a beveled surface located between and contiguous with both the end and the inboard surface, the beveled surface disposed in a plane that is recessed relative to the end and the inboard surface, the outer panel having a peripheral edge comprising a bend portion, an intermediate portion, and an end portion whereby the beveled surface at least partially receives the intermediate portion of the peripheral edge of the outer panel and the inner surface of the end portion overlies a portion of the inner surface of the peripheral flange.

* * * * *